(12) United States Patent
Choe et al.

(10) Patent No.: US 9,721,705 B2
(45) Date of Patent: Aug. 1, 2017

(54) MAGNETIC PARTICLE HAVING HIGH-REFLECTIVE PROTECTIVE MEMBRANE AND METHOD FOR PRODUCING SAME

(71) Applicant: KOREA MINTING, SECURITY PRINTING & ID CARD OPERATING CORP., Daejeon (KR)

(72) Inventors: Won Gyun Choe, Seongnam-si (KR); Soo Dong Kim, Daejeon (KR)

(73) Assignee: Korea Minting, Security Printing & ID Card Operating Corp., Daejeon (KR)

(*) Notice: Subject to any disclaimer, the term of this patent is extended or adjusted under 35 U.S.C. 154(b) by 547 days.

(21) Appl. No.: 14/366,026

(22) PCT Filed: Dec. 20, 2012

(86) PCT No.: PCT/KR2012/011145
§ 371 (c)(1),
(2) Date: Jun. 17, 2014

(87) PCT Pub. No.: WO2013/094993
PCT Pub. Date: Jun. 27, 2013

(65) Prior Publication Data
US 2015/0235745 A1     Aug. 20, 2015

(30) Foreign Application Priority Data

Dec. 22, 2011 (KR) .................. 10-2011-0139862

(51) Int. Cl.
*C09D 11/50* (2014.01)
*H01F 1/01* (2006.01)
(52) U.S. Cl.
CPC ..................... *H01F 1/01* (2013.01)

(58) Field of Classification Search
CPC ......... C09D 11/50; H01F 1/01; C01P 2006/42
(Continued)

(56) References Cited

U.S. PATENT DOCUMENTS 5,763,085 A † 6/1998 Atarashi
5,985,466 A † 11/1999 Atarashi
(Continued)

FOREIGN PATENT DOCUMENTS

CN     1183741 A     6/1998
CN     1748006 A     3/2006
(Continued)

OTHER PUBLICATIONS

English translation of the Written Opinion of the International Search Authority mailed Mar. 20, 2013 for PCT/KR2012/011145; 7 pages.*

*Primary Examiner* — Helene Klemanski
(74) *Attorney, Agent, or Firm* — The Webb Law Firm

(57) ABSTRACT

The present invention relates to a magnetic particle having a high-reflective protective membrane and a method for producing same, especially wherein the magnetic particle includes a magnetic core, a shell formed on the magnetic core, and a high-reflective protective membrane formed on the shell, and the high-reflective protective membrane has low-refractive-index and high-refractive-index membranes. The magnetic particle has advantages that have high brightness and prevent the shell from being damaged by friction with a filler and pressure between rollers during a dispersion step of an ink-making process. Also, the magnetic particle is used for different colored inks, general paint, particulate pigments for vehicles, pigments for cosmetics, catalyst paint, and especially anti-forgery inks, etc., and has advantages that are durable and express colors that existing magnetic pigments fail to.

9 Claims, 10 Drawing Sheets

(58) Field of Classification Search
USPC ...... 106/31.92; 252/62.51 C, 62.51 R, 62.54, 252/62.55; 427/127
See application file for complete search history.

(56) References Cited

U.S. PATENT DOCUMENTS

| | | | |
|---|---|---|---|
| 6,150,022 A | 11/2000 | Coulter et al. | |
| 6,261,691 B1* | 7/2001 | Atarashi | B22F 1/02 428/403 |
| 6,294,010 B1 | 9/2001 | Pfaff et al. | |
| 6,310,118 B1* | 10/2001 | Atarashi | C09D 11/50 523/205 |
| 6,589,331 B2 | 7/2003 | Ostertag et al. | |
| 6,902,807 B1* | 6/2005 | Argoitia | C09D 11/50 106/31.9 |
| 2002/0104461 A1† | 8/2002 | Schmidt et al. | |
| 2003/0170471 A1 | 9/2003 | Seto et al. | |
| 2007/0098989 A1 | 5/2007 | Raksha et al. | |
| 2007/0184268 A1* | 8/2007 | Kishimoto | C09C 3/063 428/403 |
| 2008/0050594 A1 | 2/2008 | Schuster et al. | |
| 2010/0270510 A1 | 10/2010 | Krietsch et al. | |
| 2012/0001116 A1* | 1/2012 | Raksha | H01F 1/28 252/62.55 |
| 2013/0119298 A1* | 5/2013 | Raksha | H01F 1/01 252/62.55 |
| 2014/0368821 A1* | 12/2014 | Gazaway | C09D 11/50 356/402 |
| 2015/0027218 A1* | 1/2015 | Rancien | D21H 21/46 252/62.54 |

FOREIGN PATENT DOCUMENTS

| | | |
|---|---|---|
| DE | 10114445 A1 | 9/2002 |
| DE | 69911359 T2 | 7/2004 |
| DE | 102004040444 A1 | 3/2006 |
| DE | 102008062170 A1 | 6/2009 |
| JP | 06-228604 A | 8/1994 |
| JP | 07-090310 A | 4/1995 |
| JP | 10-1701 A | 1/1998 |
| KR | 10-2000-0068214 A | 11/2000 |
| KR | 10-2006-0028393 A | 3/2006 |
| KR | 10-0829302 B1 | 5/2008 |
| WO | 96/28269 A1 | 9/1996 |

\* cited by examiner
† cited by third party (a)

(b)

(c)

MAGNETIC PARTICLE HAVING HIGH-REFLECTIVE PROTECTIVE MEMBRANE AND METHOD FOR PRODUCING SAME

TECHNICAL FIELD

The present invention relates to a magnetic particle having a high-reflective protective membrane and a method for producing same, especially wherein a high-reflective protective membrane is formed outside shell layers formed on the outer surface of a magnetic core, so that physical properties are improved.

BACKGROUND ART

Magnetic powder is chiefly applied to a permanent magnet designed to provide a flux of magnetic force, a variety of magnetic sensors for detecting changed properties of a magnetic substance caused by changes of an external magnetic field to estimate changes of external physical quantities, and a storage device for storing information, such as a hard disk drive, and also used in an anti-forgery industry to generally detect changed properties of a magnetic substance and be included in a product. However, general magnetic powder is limitedly used in industries requiring light colors because the powder is dark gray or brown in color, and has a disadvantage that only the magnetic property thereof is insufficient to achieve an anti-forgery effect. Accordingly, to solve the disadvantage, a light-colored magnetic substance has been developed using a core-shell technology. This allows a magnetic particle to have characteristics of light colors such as vividness and high brightness, and thus the magnetic particle is used for a variety of products such as different colored inks, general paint, particulate pigments for vehicles, pigments for cosmetics, catalyst paint, anti-forgery inks, etc.

Accordingly, a market has required a magnetic substance that has different colors and is used for various products, and a variety of researches on technologies concealing dark colors of the magnetic substance have been conducted.

A prior art relating to concealing dark colors of the magnetic material is known in patent document 1 "WHITE POWDER AND METHOD FOR PRODUCTION THEREOF", where in a titanium oxide membrane and a silver membrane are used to produce a light-colored magnetic substance.

However, in case of the method according to the prior art, scratches are caused on a silver membrane during an ink-making process, and thus lightness of the magnetic substance is significantly weakened. Such scratches are caused by the unique property of the silver membrane, that is, ductility. A light-colored magnetic substance is required to pass through a dispersion process in order to be used for different colored inks, general paint, particulate pigments for vehicles, pigments for cosmetics, catalyst paint, and anti-forgery inks. Accordingly, lightness of the magnetic substance is necessarily weakened when the conventional method is used, and thus the light-colored magnetic substance with such a disadvantage fails to be applied to a product. FIG. 1 shows photographs of a silver membrane that is damaged when the conventional light-colored magnetic substance is used for an ink-making process, wherein FIG. 1(a) shows a photograph of a light-colored magnetic substance before an ink-making process, while FIG. 1(b) shows a photograph of a silver membrane damaged by friction with a filler and pressure between rollers during a dispersion step of an ink-making process. When the silver membrane of the magnetic substance is damaged, reflectance drops, and thus lightness is weakened. To solve this, there is provided a solution in which a protective membrane is formed on the farthest outer surface of the light-colored magnetic substance.

In addition, in a case in which a protective membrane is generated to prevent scratches from being caused on the silver membrane, the number of the scratches is significantly decreased, while another disadvantage is caused that lightness of the magnetic substance is remarkably weakened according to refractive indexes and thickness of the protective membrane.

DISCLOSURE

Technical Problem

The present invention is applied to solve the defect, and an objective of the present invention is to prevent a silver membrane from being damaged during an ink-making process. Specifically, an objective of the present invention is to prevent friction with a filler and pressure between rollers during a dispersion step of the ink-making process and form a high-reflective protective membrane, and thus a problem that lightness of a color may be weakened when a low-reflective protective membrane is formed is solved. That is, according to the present invention, a light-colored magnetic substance has a particular thickness of a high-reflective protective membrane with a thin membrane structure formed on the farthest outer surface thereof, and thus a problem that lightness of light colors is weakened is solved.

Technical Solution

An objective of the present invention is achieved by a magnetic particle including a magnetic core, a shell which is formed on the outer surface of the magnetic core, and a high-reflective protective membrane which is formed on the outer surface of the shell, characterized in that the high-reflective protective membrane is formed in a single layer or consists of multiple layers. The shell may be formed in a single layer or multiple layers, characterized in that the single layer has a metal material, while the multiple layers have dielectric substances, and besides, the shell with a multiple-layers structure includes a first shell made out of a dielectric material and a second shell made out of a metallic material, wherein the dielectric material is one or more of a group consisting of titanium dioxide, silicon dioxide, alumina, calcium carbonate, zirconium oxide, magnesium fluoride, zinc oxide, and zinc sulfide. In addition, the above-mentioned metallic material is one or more of a group consisting of copper, nickel, gold, platinum, silver, aluminum, and chrome, and the high-reflective protective membrane with a single-layer structure has an optical thickness of $(0.42*N)-0.17$ to $(0.42*N)+0.17$ wavelength (here, N is an integer), wherein the membrane is made out of one or more of a group consisting of titanium dioxide, silicon dioxide, alumina, calcium carbonate, zirconium oxide, magnesium fluoride, zinc oxide, zinc, sulfide, aluminum oxide, chromium oxide, cadmium oxide, vanadium pentoxide, polyisobutylene, polyethylene, acrylic polymer, and styrene polymer. In addition, it is characterized in that the high-reflective protective membrane with a multiple-layers structure consists of a low-refractive-index membrane formed on the outer surface of the shell and a high-refractive-index membrane formed on the outer surface of the low-refractiveindex membrane. Furthermore, it is characterized in that the low-refractive-index membrane is made out of one or more of a group consisting of silicon dioxide, magnesium fluoride, polystyrene, polymethyl methacrylate, polystyreme-co-butadiene, vanadium pentoxide, cadmium oxide, polyisobutylene, and polyethylene, while the high-refractive-index membrane is made out of one or more of a group consisting of titanium dioxide, aluminum oxide, sine oxide, zirconium oxide, and chromium oxide. Besides, it is characterized in that the low-refractive-index membrane and the high-refractive-index membrane have an optical thickness in the range of 0.15 to 0.35 wavelength, respectively.

A method for producing a magnetic particle with a high-reflective protective membrane according to the present invention includes forming a shell with a single-layer or multiple-layers structure on the outer surface of a magnetic core, and forming a high-reflective protective membrane with a single-layer or multiple-layers structure on the outer surface of the shell. In addition, forming the shell with a multiple-layers structure further includes forming a first shell containing a dielectric material and forming a second shell containing a metallic material on the outer surface of the first shell, and forming a high-reflective protective membrane with a multiple-layers structure further includes forming a low-refractive-index membrane on the outer surface of the second shell and forming a high-refractive-index membrane on the outer surface of the low-refractive-index membrane.

According to the present invention, the magnetic particle may be contained in certain kinds of ink that are used to prevent marketable securities from being forged.

Advantageous Effects

According to the present invention, a magnetic particle has a protective membrane, thereby preventing a silver membrane from being damaged during an ink-making process and also has a high-reflective structure, thereby preventing lightness of a magnetic substance from being weakened. Besides, the magnetic particle is protected by the protective membrane, and thus wear, chemical, and light resistances are improved.

DESCRIPTION OF THE REFERENCE NUMERALS IN THE DRAWINGS

Figure 1:
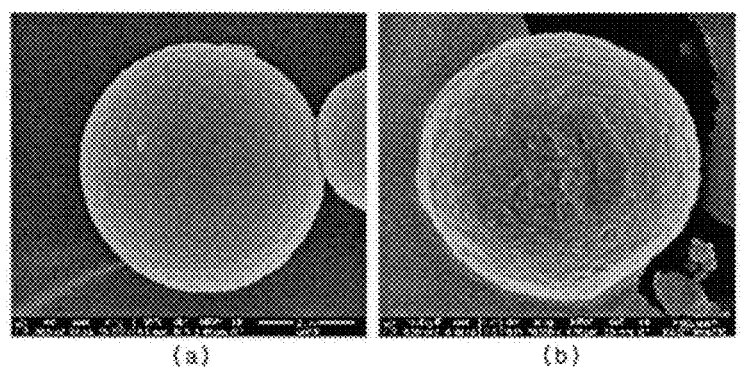
FIG. 1 shows photographs of an existing light-colored magnetic substance and a case in which a silver membrane of the magnetic substance is damaged during an ink-making process.

100: magnetic core 200: shell
300: high-reflective protective membrane
310: low-refractive-index membrane
320: high-refractive-index membrane
210: shell made out of a dielectric material (first shell)
211 to 213: first to third dielectric membranes
220: shell made out of a metallic material (second shell)
221 to 223: first to third metallic membranes
Mode for Invention Hereinafter, a magnetic particle with a high-reflective protective membrane and a method for producing the membrane according to the present invention are described in detail with reference to the accompanying drawings. The drawings are provided by way of example so that the idea of the present invention is understood to those skilled in the art. Accordingly, the present disclosure may be embodied in many different forms and should not be construed as limited to the exemplary embodiments set forth herein, and the drawings may be exaggerated for the sake of clearer description. In addition, the same drawing reference numerals are understood to refer to the same elements, features, and structures throughout the drawings and the detailed description.

Herein, unless defined otherwise, all technical and scientific term, used herein have the same meaning as commonly understood, by one of those skilled in the art to which this invention belongs and also, in the following description and accompanying drawings, descriptions of known functions and configurations that may unnecessarily make the gist of the present invention obscure will be omitted.

Although illustrated in a spherical shape in the accompanying drawings, a magnetic particle is not limited to the spherical shape and may be provided in a plate shape.

Figure 2:
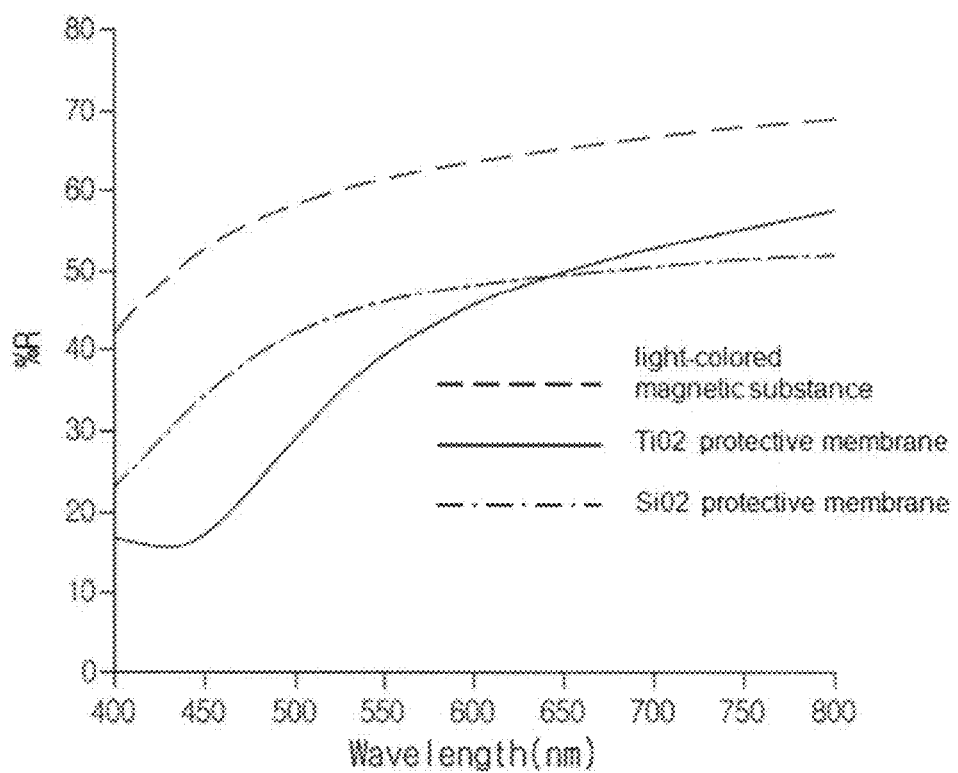
FIG. 2 graphically illustrates the comparison of reflectance between a light-colored magnetic substance and another light-colored magnetic substance having a single layer of a low-reflective protective membrane.
Figure 3:
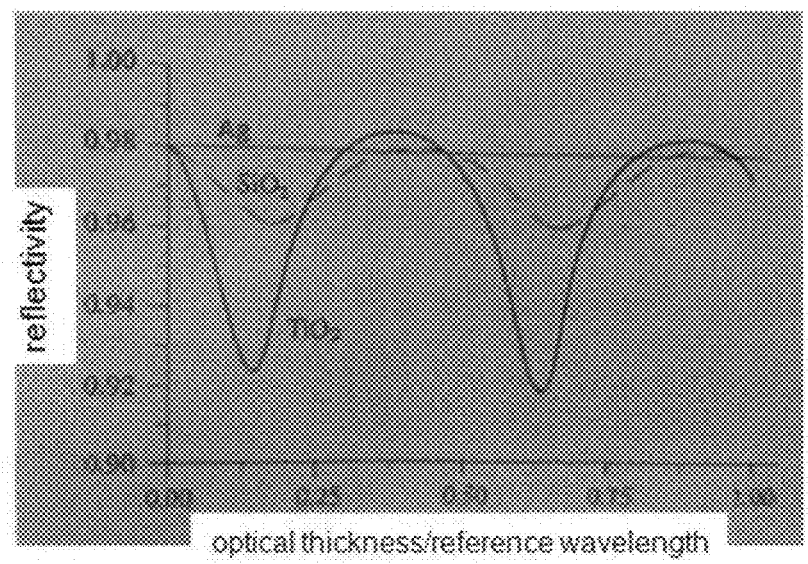
FIG. 3 graphically illustrates reflectance of the protective membrane having a single-layer structure according to optical thickness of the protective membrane.

FIG. 2 graphically illustrates the comparison of reflectance between a light-colored magnetic substance and another light-colored magnetic substance having a single layer of a low-reflective protective membrane. Referring to FIG. 2, the light-colored magnetic substance having a $TiO_2$ or $SiO_2$ low-reflective protective membrane has reflectance lower than the light-colored magnetic substance without a protective membrane. As described above, a low-reflective protective membrane prevents a silver membrane from being damaged and improves durability of the magnetic substance, while causing reflectance of the silver membrane to drop, and thus it is required to form a high-reflective protective membrane having a single-layer or multiple-layers structure. The high-reflective protective membrane is configured in such a manner that a thin membrane forms an interference-layer structure, and thus reflectance of the silver membrane is prevented from dropping. FIG. 3 graphically illustrates reflectance of the protective membrane having a single-layer structure according to optical thickness of the protective membrane. Referring to FIG. 3, reflectance of the protective membrane having a single-layer structure sharply drops at an optical thickness thinner than a quarter wavelength optical thickness, while being similar to or slightly higher than silver at an optical thickness thinner than a half wavelength optical thickness. That is, in the range of 0.3 to 0.6 wavelength optical thickness, the protective membrane functions as a high-reflective protective membrane. The protective membrane having a single-layer structure functions as a high-reflective protective membrane in the range of (0.42*N)−0.17 to (0.42*N) +0.17 wavelength optical thickness (N is an integer), wherein, the protective membrane physically becomes thicker when N is 2 or more, thereby having significantly-less practical use. Accordingly, when N is 1, that is, in the range of 0.3 to 0.6 wavelength optical thickness, the protective membrane having a single-layer structure functions as a high-reflective protective membrane.

Figure 4:
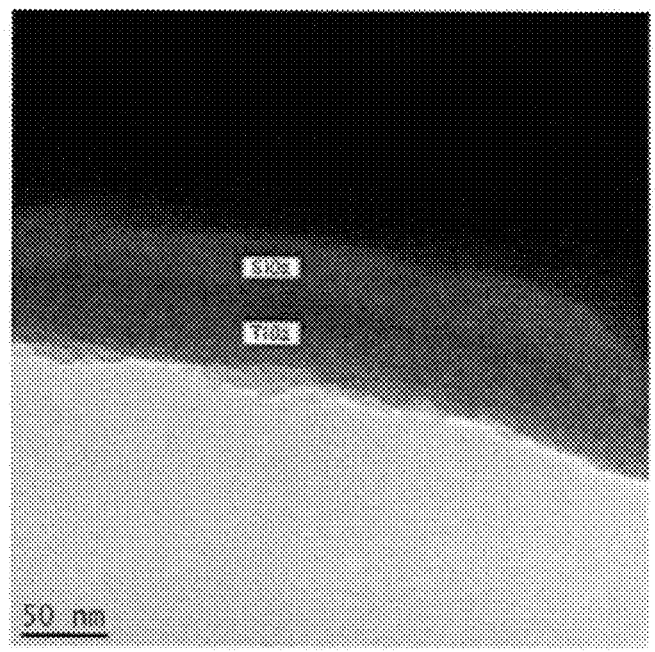
FIG. 4 shows a Transmission Electron Microcopy (TEM) photograph of a protective membrane with a multiple-layers structure.
Figure 5:
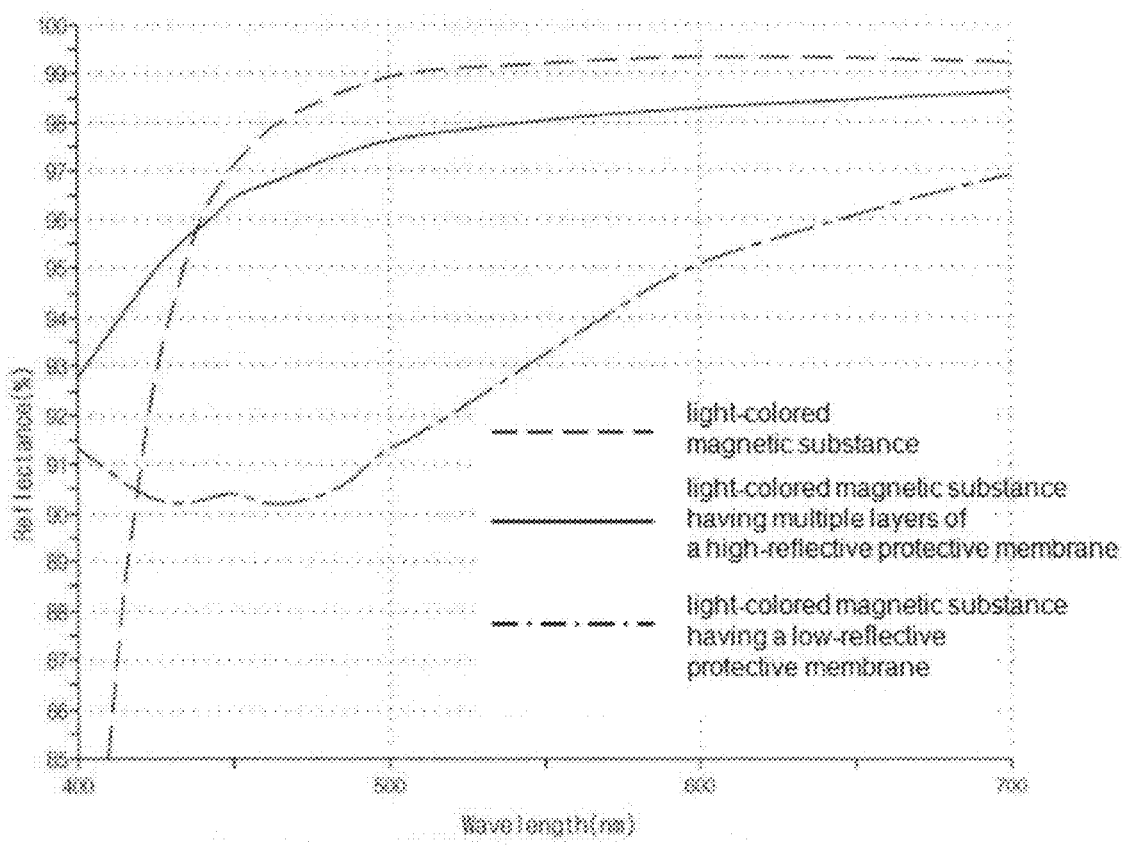
FIG. 5 graphically illustrates the theoretical result of reflectance among a light-colored magnetic substance without a protective membrane, another light-colored magnetic substance with a low-reflective protective membrane, and a further light-colored magnetic substance with a multiple-layers structure of a high-reflective protective membrane.

FIG. 4 shows a TEM photograph of a protective membrane with a multiple-layers structure, and FIG. 5 graphically illustrates the theoretical result of reflectance among a light-colored magnetic substance without a protective membrane, another light-colored magnetic substance with a low-reflective protective membrane, and a further light-colored magnetic substance with a multiple-layers structure of a high-reflective protective membrane. Referring to FIG. 5, theoretically, the light-colored magnetic substance with a multiple-layers structure of a high-reflective protective membrane has reflectance higher than the light-colored magnetic substance without a protective membrane and another light-colored magnetic substance with a low-reflective protective membrane. However, because the membrane has an uneven surface and also the magnetic substance does not have a flat shape in reality, even the light-colored magnetic substance with a multiple-layers structure of a high-reflective protective membrane may have reflectance lower than the light-colored magnetic substance without a protective membrane. However, the protective membrane has multiple-layers of high-reflective structure, thereby having remarkably-improved reflectance in comparison with the protective membrane having a low-reflective structure, and having improved durability, chemical resistance, and light resistance in comparison to a case without a protective membrane.

Figure 6:
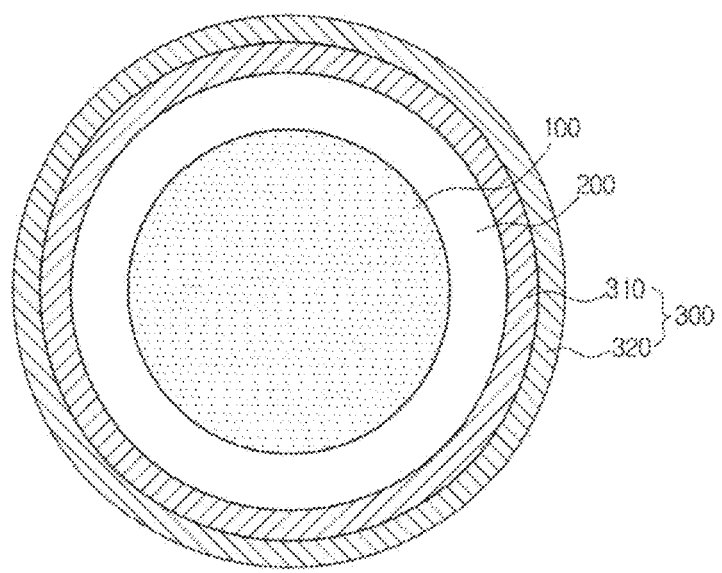
FIG. 6 illustrates an example of a magnetic particle according to the present invention in a cross-sectional view.

FIG. 6 illustrates an example of a magnetic particle according to the present invention in a cross-sectional view. As shown in FIG. 6, the magnetic particle according to the present invention includes a magnetic core 100, a shell 200 formed on the outer surface of the magnetic core 100, and a high-reflective protective membrane 300 formed on the outer surface of the shell 200, wherein the high-reflective protective membrane 300 may have a single layer or multiple layers.

The magnetic core 100 provides a magnetic property to a magnetic substance according to the present invention.

Also, the shell 200 is made out of a metallic or dielectric material, and may have a single layer or multiple layers, wherein the layers may be made out of materials same as or different from each other.

Figure 7:
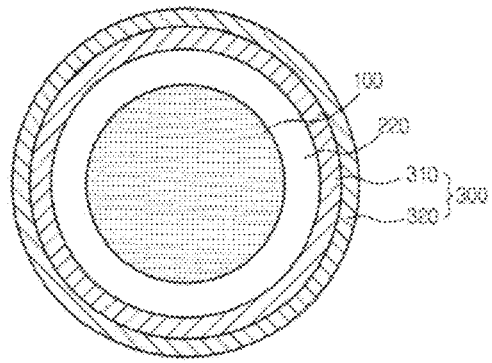
FIG. 7 illustrates another example of the magnetic particle according to the present invention in a cross-sectional view.
Figure 7:
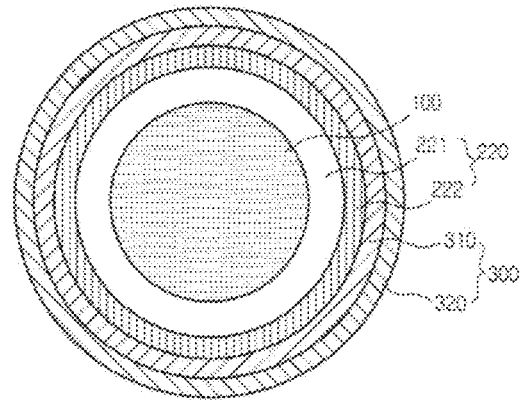
Figure 7:
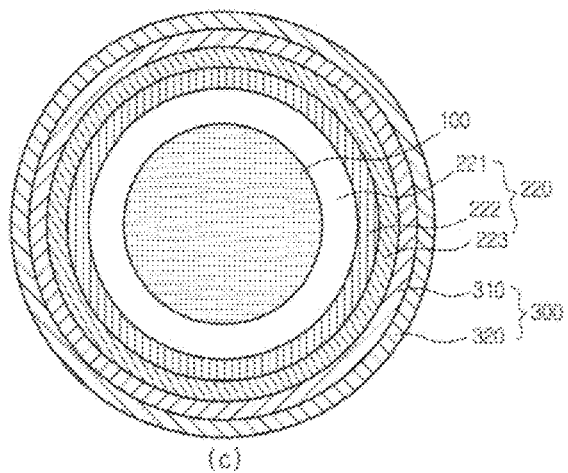
Figure 8:
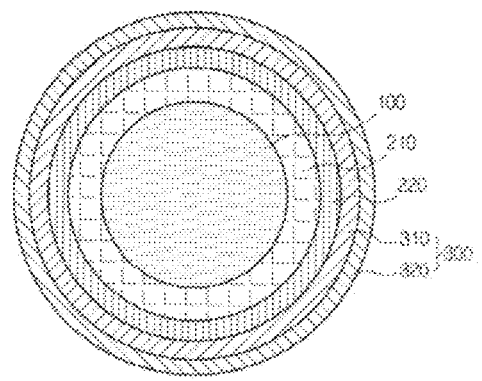
FIG. 8 illustrates a further example of the magnetic particle according to the present invention in a cross-sectional view.

For example, FIG. 7 illustrates a case in which the shell is made out of a metallic material, and FIG. 8 illustrates a case in which the shell is made out of metallic and dielectric materials.

The shell 220 made out of a metallic material in FIG. 7 may have a single layer (reference numeral 200 in FIG. 7(*a*)), two layers (reference numerals 221 and 222 in FIG. 7(*b*)), three layers (reference numerals 221, 222, and 223 in FIG. 7(*c*)), or more.

Hereinafter, in a case in which a shell 200 has the one 220 made out of a metallic material, the magnetic particle I according to the present invention is described with reference to FIG. 7.

As shown in FIG. 7, the magnetic particle I includes a shell 220 made out of a metallic material, a magnetic core 100, and a high-reflective protective membrane 300 formed on the outer surface of the shell 220 made out of a metallic material, wherein the high-reflective protective membrane 300 may have a single-layer or multiple-layers structure.

The magnetic core 100 provides a magnetic property to the magnetic particle I according to the present invention.

Specifically, the magnetic core 100 of the magnetic particle I is a strong magnetic substance, wherein the magnetic core 100 is preferably made out of one or more among a group consisting of iron, nickel, cobalt, iron oxide, nickel oxide, cobalt oxide, and a multicomponent material that contains two or more elements of iron, nickel, and cobalt.

Considering industries to which the magnetic particle I is applied, the magnetic core 100 may be adjusted in size. In a case in which the magnetic particle I is applied to anti-forgery ink, it is preferred that the magnetic core 100 has a size of 0.4 to 40 μm, and is formed in a flat shape so that reflectance is improved.

The shell 220 made out of a metallic material increases brightness of the magnetic particle I. The shell 220 may be preferably made out of one or more among the following metallic materials: copper; nickel; gold; platinum; silver; aluminum; and chrome, and more preferably one or more among the following materials; copper; nickel; silver; and chrome.

Here, the shell 220 made out of a metallic material may be a metallic spherical membrane having a single layer, or a multiple-layers membrane wherein metallic membranes different from each other are formed in a laminated manner.

Specifically, in a case in which the shell 220 made out of a metallic material has a single-layer membrane, the single-layer membrane may be preferably made out of one or more among copper, nickel, silver, and chrome, and the shell 220 made out of a metallic material may have a thickness of 10 to 500 nm to improve brightness of the magnetic particle I.

Also, the shell 220 made out of a metallic material has a laminated membrane formed in such a manner that two or more layers made out of metallic materials different from each other are laminated, wherein the laminated membrane is configured in such a manner that a first metallic membrane 221 and a second metallic membrane 222 are laminated each other, as shown in FIGS. 7(*b*) and 7(*c*), or the first metallic membrane 221, the second metallic membrane, and a third metallic membrane 223 are laminated each other, as shown in FIG. 7(*c*).

It is preferred that the first to third metallic membranes 221 to 223 are made out of one or more among copper, nickel, gold, platinum, silver, aluminum, and chrome, wherein the materials used for the membranes are different from each other.

The high-reflective protective membrane 300 protects the shell 220 made out of a metallic material and prevents reflectance of light from dropping because of an interference effect of light. Especially, the protective membrane 300 prevents the shell 200 from being damaged by friction with a filler and pressure between rollers during a dispersion step of an ink-making process, and thus wear, chemical, and light resistances of the magnetic particle I are improved. The high-reflective protective membrane 300 consists of a single layer or multiple layers, wherein the protective membrane having a single-layer structure functions as a high-reflective protective membrane in the range of (0.42*N)−0.17 to (0.42*H) +0.17 wavelength optical thickness (N is an integer), as described above. It is preferred that the value of N is 1, that is, the membrane has a thickness of 0.3 to 0.6 wavelength optical thickness. In addition, it is preferred that the protective membrane having a single-layer structure is made out of one or more among a group consisting of titanium dioxide, silicon dioxide, alumina, calcium carbonate, zirconium oxide, magnesium fluoride, zinc oxide, and zinc sulfide. The protective membrane having a multiple-layers structure consists of a low-refractive-index membrane 310 and a high-refractive-index membrane 320, wherein the low-refractive-index membrane 310 has a refractive index of 1.2 to 1.8, while the high-refractive-index membrane 320 has a refractive index of 1.6 to 2.7. The low-refractive-index membrane may be made out of one or more among a group consisting of silicon dioxide, magnesium fluoride, polystyrene, polymethyl methacrylate, polystyreme-co-butadiene, vanadium pentoxide, cadmium oxide, polyisobutylene, and polyethylene, while the high-refractive-index membrane may be made out of one or more of a group consisting of titanium dioxide, aluminum oxide, zinc oxide, zirconium oxide, and chromium oxide. It is preferred that the low-refractive-index membrane and the high-refractive-index membrane have a thickness of 0.15 to 0.35 wavelength optical thickness, respectively. In case of an optically-isotropic device, a value calculated by multiplying a physical thickness and a refractive index is equal to another value calculated by multiplying a reference wavelength and an optical thickness. However, the range of the physical thickness (nm) that satisfies an optimum optical thickness having an interference effect may be considerably variable because materials used for the protective membrane have refractive indexes different from each other. Accordingly, the range of the physical thickness is determined using the optical thickness.

For example, optical thickness of titanium oxide and silicon dioxide having a quarter wavelength optical thickness are calculated as follows. The titanium oxide has a refractive index of 2.35 at a reference wavelength of 510 nm, and thus a physical thickness is calculated in the following mathematical expression: 2.35* physical thickness =0.25* 510 nm. As a result, the titanium oxide has a physical thickness of 54 nm at a quarter wavelength optical thickness. Whereas, the silicon dioxide has a refractive index of 1.46 at the same reference wavelength, and thus a physical thickness is calculated in the following mathematical expression: 1.46* physical thickness=0.25* 510 nm. As a result, the silicon dioxide has a physical thickness of 87 nm at a quarter wavelength optical thickness.

Reflectance improved by an interference effect is slightly increased beyond the above-mentioned range of the optical thickness. Reflectance R of the high-reflective protective membrane having multiple layers is calculated in the following mathematical expression.

$$R = \tanh^2\left(S\ln\frac{n_H}{n_L} + \frac{1}{2}\ln\frac{n_H^2}{n^{?}\;?}\right) \quad \text{Expression 1}$$

(In this expression, $n_H$, $n_L$, $n^?$ represent a high-refractive-index membrane, a low-refractive-index membrane, and a refractive index of a substrate, respectively, and S represents how many times the high-refractive-index membrane and low-refractive-index membrane are repeated.)

According to the expression, reflectance is closely connected with refractive indexes of the refractive-index membranes as well as the repeated times of the high-refractive-index membrane and low-refractive-index membrane, wherein the more times the high-refractive-index membrane and low-refractive-index membrane are repeated, the higher reflectance is increased. However, although the repeated times are remarkably increased, reflectance is slightly increased in reality. Accordingly, it is preferred that the protective membrane has one layer of a high-refractive-index membrane and one layer of a low-refractive-index membrane, considering economic feasibility.

Hereinafter, in a case in which a shell 200 has the one 210 made out of a dielectric material and another one 220 made out of a metallic material, a magnetic particle II according to the present invention is described with reference to FIG. 8.

As shown in FIG. 8, the magnetic particle II includes a magnetic core 100, a shell 210 which is made out of a dielectric material and formed on the outer surface of the magnetic core 100, another shell 220 which is made out of a metallic material and formed on the outer surface of the shell 210 made out of a dielectric material, and a high-reflective protective membrane 300 formed on the outer surface of the shell 220 made out of a metallic material, wherein the high-reflective protective membrane 300 may have a single-layer or multiple-layers structure.

According to one embodiment of the present invention, the magnetic core 100 is disposed in the center of the magnetic particle II to provide a magnetic property to the magnetic particle II.

Specifically, the magnetic core 100 of the magnetic particle II is a strong magnetic substance similarly to the magnetic core 100 of the magnetic particle I, wherein the magnetic core 100 is preferably made out of one or more among a group consisting of iron, nickel, cobalt, iron oxide, nickel oxide, cobalt oxide, and a multicomponent material that contains two or more elements of iron, nickel, and cobalt.

Considering industries to which the magnetic particle II is applied, the magnetic core may be adjusted in size. In a case in which the magnetic particle II is applied to anti-forgery ink, it is preferred that the magnetic core 100 has a size of 0.4 to 40 μm, and is formed in a flat shape so that reflectance is improved.

The second shell 220 made out of a metallic material is formed on the outer surface of the shell 210 (hereinafter, a first shell), and the high-reflective protective membrane 300 consisting of the low-refractive-index membrane 310 and the high-refractive-index membrane 320 is formed on the outer surface of the second shell 220 made out of a metallic material, and thus reflectance of the magnetic particle II is improved.

Similarly to the shell made out of a metallic material of the magnetic particle I, the second shell 220 may be preferably made out of one or more among the following materials: copper; nickel; gold; platinum; silver; aluminum;

and chrome, and more preferably one or more among the following materials: copper; nickel; silver; and chrome.

The second shell 220 preferably has a thickness of 40 to 150 nm. The second shell 220 improves brightness of the magnetic particle II.

Figure 9:
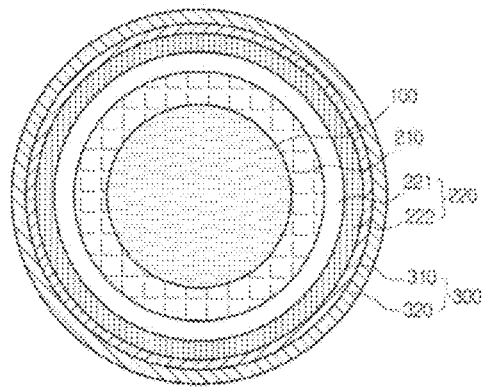
FIG. 9 illustrates a further example of the magnetic particle according to the present invention in a cross-sectional view.

Here, as shown in FIG. 9, the second shell 220 made out of a metallic material may be a metallic spherical membrane having a single layer, or a multiple-layers membrane wherein metallic membranes different from each other 221 to 223 are formed in a laminated manner.

Specifically, the second shell 220 made out of a metallic material may have a laminated membrane formed in such a manner that two or more layers made out of metallic materials different from each other are laminated. Although FIG. 9 illustrates an example of a case in which the second shell 220 is configured in such a manner that tow metallic layers (a first metallic membrane 221 and a second metallic membrane 222) are laminated each other, the present invention is not limited to the number of laminated metallic membranes. Here, it is preferred that, as shown in FIG. 9, the laminated membrane consisting of the first metallic membrane 221 and the second metallic membrane 222 has a thickness of 40 to 150 nm (that is, the total thickness of the laminated metallic membranes) similarly to the metallic membrane having a single-layer structure.

The high-reflective protective membrane 300 formed on the outer surface of the second shell 220 prevents the shell 220 from being damaged by friction with a filler and pressure between rollers during a dispersion step of an ink-making process, and thus wear, chemical, and light resistances of the magnetic particle II are improved. It is preferred that a dielectric material of the first shell 210 is one or more among a group consisting of titanium dioxide, silicon dioxide, alumina, calcium carbonate, zirconium oxide, magnesium fluoride, zinc oxide, and zinc sulfide, and the first shell 210 has a thickness of 10 to 500 nm.

Figure 10:
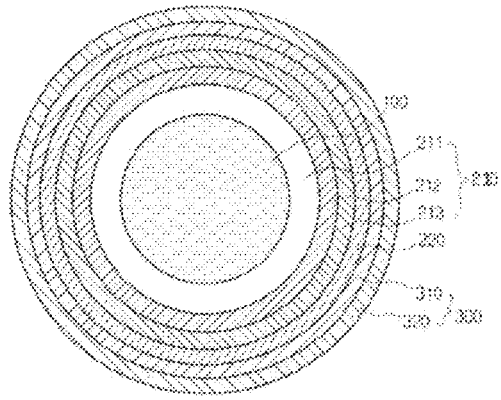
FIG. 10 illustrates a further example of the magnetic particle according to the present invention in a cross-sectional view.

Here, as shown in FIG. 10, the first shell 210 has a laminated membrane formed in such a manner that too or more inorganic layers having refractive indexes different from each other are laminated. Although FIG. 10 illustrates an example of a case in which the first shell 210 is configured in such a manner that three dielectric membranes having refractive indexes different from each other (a first dielectric membrane 211, a second dielectric membrane 212, and a third dielectric membrane 213) are laminated each other, the present invention is not limited to the number of laminated metallic membranes.

The high-reflective protective membrane 300 protects the shell 220 made out of a metallic material and prevents reflectance of light from dropping because of an interference effect of light. Especially, the protective membrane 300 prevents the shell 200 from being damaged by friction with a filler and pressure between rollers during a dispersion step of an ink-making process, and thus wear, chemical, and light resistances of the magnetic particle II are improved. The high-reflective protective membrane 300 may consist of a single layer or multiple layers, wherein the protective membrane having a single-layer structure functions as a high-reflective protective membrane in the range of (0.42*N)−0.17 to (0.42*N)+0.17 wavelength optical thickness (N is an integer), as described above. It is preferred that the value of N is 1, that is, the membrane has a thickness of 0.3 to 0.6 wavelength optical thickness. In addition, it is preferred that the protective membrane having a single-layer structure is made out of one or more among a group consisting of titanium dioxide, silicon dioxide, alumina, calcium carbonate, zirconium oxide, magnesium fluoride, zinc oxide, and zinc sulfide. The protective membrane having a multiple-layers structure consists of a low-refractive-index membrane 310 and a high-refractive-index membrane 320, wherein the low-refractive-index membrane 310 has a refractive index of 1.2 to 1.8, while the high-refractive-index membrane 320 has a refractive index of 1.6 to 2.7. The low-refractive-index membrane may be made out of one or more among a group consisting of silicon dioxide, magnesium fluoride, polystyrene, polymethyl methacrylate,polystyreme-co-butadiene, vanadium pentoxide, cadmium oxide, polyisobutylene, and polyethylene, while the high-refractive-index membrane may be made out of one or more of a group consisting of titanium dioxide, aluminum oxide, zinc oxide, zirconium oxide, and chromium oxide. It is preferred that the low-refractive-index membrane and the high-refractive-index membrane have a thickness of 0.15 to 0.35 wavelength optical thickness, respectively. In case of an optically-isotropic device, optical thickness is a value calculated in such a manner that a physical thickness is multiplied by a refractive index, that is, a refractive index of a medium is multiplied by thickness (nm). However, the range of the physical thickness (nm) that satisfies an optimum optical thickness having an interference effect may be considerably variable because materials used for the protective membrane have refractive indexes different from each other. Accordingly, the range of the physical thickness is determined using the optical thickness. Reflectance improved by an interference effect is slightly increased beyond the above-mentioned range of the optical thickness.

A method for producing the magnetic particle II having a high-reflective protective membrane is described in detail with reference to FIG. 11.

Figure 11:
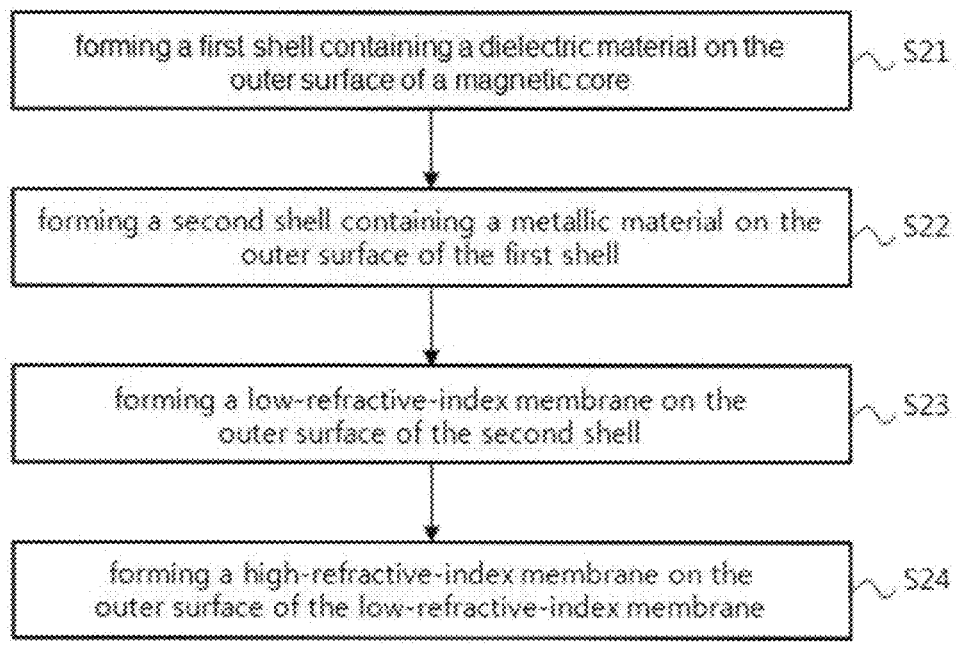
FIG. 11 is a flowchart of a method for producing a magnetic particle according to the present invention.

As shown in FIG. 11, the method for producing the magnetic particle II includes forming a first shell made out of a dielectric material on the outer surface of a magnetic core (S21), forming a second shell made out of a metallic material on the outer surface of the first shell (S22), forming a low-refractive-index membrane on the outer surface of the second shell (S23), and forming a high-refractive-index membrane on the outer surface of the low-refractive-index membrane.

It is preferred that forming the first shell made out of a dielectric material and the second shell made out of a metallic material around the magnetic core is performed in such a manner that impregnating a metal precursor solution with the magnetic core, and then applying a reductant to the impregnated solution so that a metallic membrane is formed on the magnetic core, or mixing the magnetic core with metallic particles and stir the mixture so that a metallic membrane is physically formed on the magnetic core, and after that, oxidizing the formed metallic membrane so that an inorganic substance-magnetic core complex is produced.

In one detailed embodiment, a shell made out of a dielectric material may have variable thickness according to reaction temperature while the shell is being formed, wherein it is preferred that a reaction temperature is in the range of 20 to 85° C. in a case in which the dielectric material is titanium dioxide.

Although the following example is added to provide the detailed description of the present invention, the present invention is not limited thereto.

EXAMPLE 1

Forming a Layer of Titanium Dioxide on the Outer Surface of a Magnetic Core

Particles of a magnetic core 120 g and distilled water 24 ml are put into ethanol 3.6 L, and then ultrasonic waves are applied to the mixture so that the mixture is dispersed. Tetrabuthoxy titanium (TBOT) 35 ml and ethanol 300 ml are mixed together, and then slowly put into the dispersed mixture for half an hour. In a room temperature, the mixture with TBOT is stirred at 300 rpm for 3 hours. A powder of the magnetic particles is separated from the mixture using a magnet, and then cleaned with ethanol twice and dried.

EXAMPLE 2

Forming a Silver Membrane on the Magnetic Core Having a Titanium Dioxide Layer Formed Thereon Glucose 85 g and potassium tartrate 5 g are dissolved in distilled water 800 ml so that a reducing solution is produced. Sodium hydroxide (NaOH) 12 g, ammonium hydroxide ($NH_4OH$) 100 ml, and silver nitrate ($AgNO_3$) 55 g are dissolved in distilled water 800 ml so that a colorless and transparent silver-amine complex solution is produced.

Particles of the magnetic core 80 g with a titanium dioxide layer, which is produced in the foregoing process, are put into distilled water 2.4 L. After that, the colorless and transparent silver-ammine complex solution is mixed with the mixed distilled water, and ultrasonic waves are applied to the mixed silver-ammine complex solution. In a room temperature, the mixed silver-ammine complex solution is stirred at 300 rpm for 3 hours, and then mixed with the reducing solution. After that, applying ultrasonic waves and stirring are continuously performed for 20 minutes so that a silver membrane is formed. The core particles are separated from the mixture using a magnet, and then cleaned with ethanol twice and dried.

EXAMPLE 3

Forming a Protective Membrane of Silicon Dioxide on the Outer Surface of the Silver Membrane of the Magnetic Core Particles of the magnetic core with a silver membrane 120 g, distilled water 30 ml, NH4OH 150 ml are put into ethanol 3.6 L. After that, ultrasonic waves are applied to the mixture for 3 minutes so that the mixture is dispersed. Tetraethly orthosilicate (TEOS) 40 ml and ethanol 300 ml are mixed together, and then slowly put into the dispersed mixture for half an hour. In a room temperature, the mixture with TEOS is stirred at 300 rpm for 3 hours. A powder of the magnetic particles is separated from the mixture using a magnet, and then cleaned with ethanol twice and dried.

EXAMPLE 4

Forming a Protective Membrane of Titanium Dioxide on the Farthest Outer Surface of the Magnetic Core with a Protective Membrane of Silicon Dioxide Particles of the magnetic core with a protective membrane of silicon dioxide 120 g and distilled water 24 ml are put into ethanol 3.6 L. After that, ultrasonic waves are applied to the mixture for 3 minutes so that the mixture is dispersed. TBOT 38 ml and ethanol 300 ml are mixed together, and then slowly put into the dispersed mixture for half an hour. At 85° C., the mixture is stirred at 300 rpm for 3 hours. A powder of the magnetic particles is separated from the mixture using a magnet, and then cleaned with ethanol twice and dried.

(Experiments)
[Wear Resistance Test]

Figure 12:
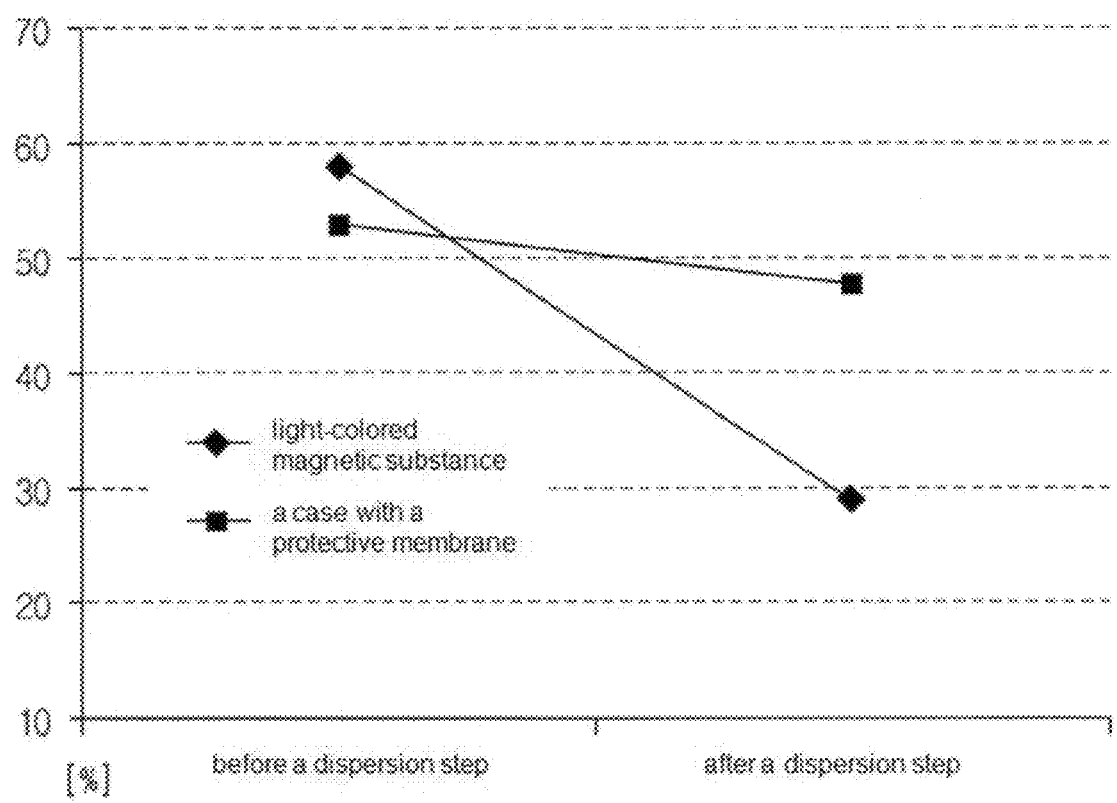
FIG. 12 graphically illustrates reflectance at 555 nm before and after a dispersion step of ink.

Reflectance before and after a dispersion process of ink was measured to verify that a magnetic particle according to the present invention has improved wear resistance. Ink made using magnetic particles was applied to paper using an applicator, and then the applied paper was dried for 48 hours. After that, reflectance of the dried paper was measured using a reflectance measurement instrument (Varian, Cary 5000). FIG. 12 graphically illustrates reflectance at 555 nm before and after a dispersion step of ink, wherein referring to FIG. 12, the magnetic particle according to the present invention has slightly-decreased reflectance in comparison with a case without a protective membrane. That is, reflectance of a magnetic particle with a silver membrane sharply dropped because the silver membrane was damaged during a dispersion process, while reflectance of the magnetic particle with a high-reflective protective membrane gradually dropped.

[Chemical Resistance Test]

Figure 13:
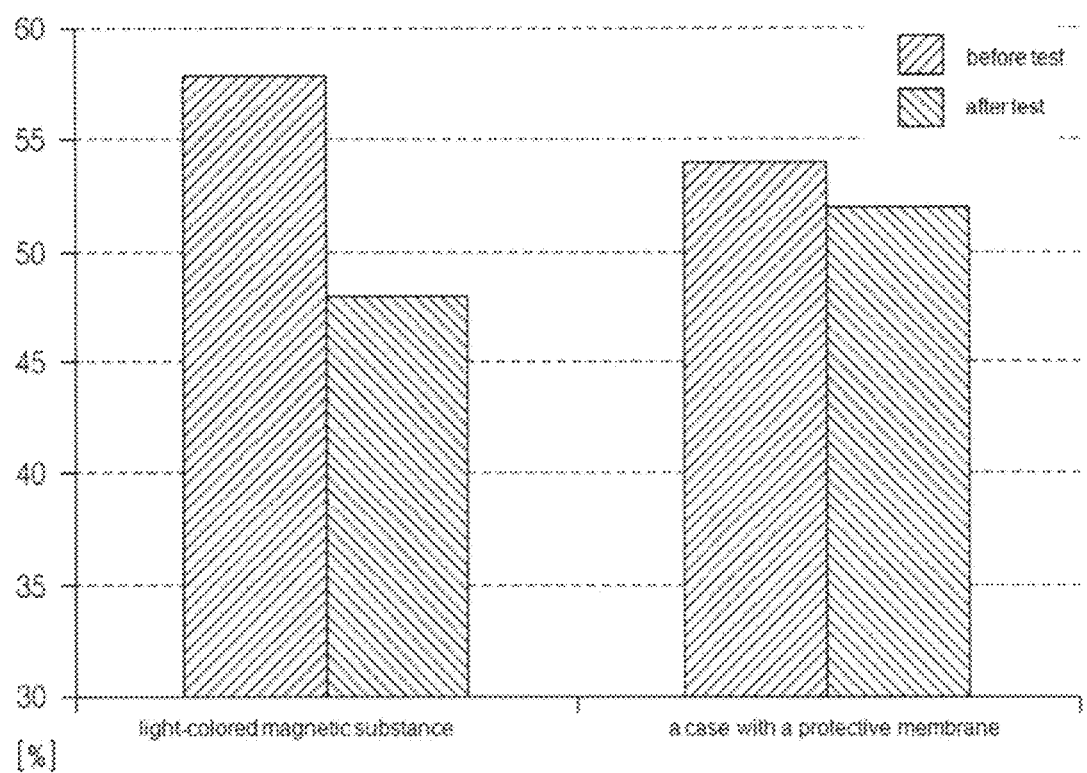
FIG. 13 graphically illustrates reflectance at 555 nm before and after a chemical resistance test.

Reflectance was measured to verify that a magnetic particle according to the present invention has improved chemical resistance. Ink made using magnetic particles was applied to paper using an applicator, and then the applied paper was dried for 48 hours. After that, reflectance of the dried paper was measured using a reflectance measurement instrument (Varian, Cary 5000). And a chemical resistance test was performed against the dried paper, and then reflectance of the dried paper was re-measured. The chemical resistance test was performed using a 5% sodium hypochlorite solution at 23° C. for half an hour. A magnetic particle with a silver membrane had decreased reflectance because the silver membrane was damaged in the sodium hypochlorite solution, while reflectance of the magnetic particle according to the present invention dropped less than the case with a silver membrane because a protective membrane was formed on the farthest outer surface of the magnetic particle according to the present invention. FIG. 13 graphically illustrates reflectance at 555 nm before and after a chemical resistance test, wherein referring to FIG. 13, before the chemical resistance test, the magnetic particle with a protective membrane according to the present invention had reflectance lower than the case without a protective membrane, while after the chemical resistance test, the magnetic particle with a protective membrane had reflectance higher than the case without a protective membrane. As a result, brightness is improved.

[Light Resistance Test]

Observing whether yellowing occurs and the degree by which the yellowing is advanced was performed to verify that a magnetic particle according to the present invention has improved light resistance. Ink made using magnetic particles was applied to paper using an applicator, and then the applied paper was dried for 48 hours. After that, reflectance of the dried paper was measured using a reflectance measurement instrument (Varian, Cary 5000). And a light resistance test was performed against the dried paper, and then reflectance of the dried paper was re-measured. The light resistance test was performed using a light resistance tester (Atlas, Ci4000 Xenon Weather-Ometer) for 100 hours. After the light resistance test, yellowing happened to ink made out of magnetic particles having a silver membrane rather than a protective membrane, while yellowing was relieved in case of ink made out of magnetic particles with a protective membrane.

Although a few exemplary embodiments of the present invention have been shown and described by limited embodiments and drawings, the present invention is not limited to the described exemplary embodiments. Instead, it would be appreciated by those skilled in the art that modifications and variations may be made to these exemplary embodiments.

Therefore, the idea of the invention is not limited to the above-described embodiments, and the claims, their equivalents, and all modifications within the equivalent scope of the invention belong to the scope of the invention.

The invention claimed is:

1. Magnetic particle having a high-reflective protective membrane, comprising:
a magnetic core;
a first shell formed on an outer surface of the magnetic core and made out of a dielectric material;
a second shell formed on an outer surface of the first shell and made out of a metallic material; and
a high-reflective protective membrane formed on an outer surface of the second shell;
wherein the high-reflective protective membrane has a single layer and an optical thickness of $(0.42*N)-0.17$ to $(0.42*N)+0.17$ wavelength, where N is an integer, or wherein the high-reflective protective membrane has multiple layers having a low-refractive-index membrane having an optical thickness in the range of 0.15 to 0.35 wavelength formed on an outer surface of the second shell and a high-refractive-index membrane having an optical thickness in the range of 0.15 to 0.35 wavelength formed on an outer surface of the low-refractive-index membrane,
wherein the first shell has a single-layer structure, and the dielectric material of the first shell comprises titanium dioxide,
wherein the second shell has a single-layer structure, and the metallic material of the second shell comprises silver,
wherein the low-refractive-index membrane is made out of silicon dioxide and optionally one or more of a group consisting of magnesium fluoride, polystyrene, polymethyl methacrylate, polystyrene-co-butadiene, vanadium pentoxide, cadmium oxide, polyisobutylene, and polyethylene, and
wherein the high-refractive-index membrane is made out of titanium dioxide and optionally one or more of a group consisting of aluminum oxide, zinc oxide, zirconium oxide, and chromium oxide.

2. Magnetic particle having a high-reflective protective membrane according to claim 1, wherein the dielectric material further comprises one or more of a group consisting of silicon dioxide, alumina, calcium carbonate, zirconium oxide, magnesium fluoride, zinc oxide, and zinc sulfide.

3. Magnetic particle having a high-reflective protective membrane according to claim 1, wherein the metallic material further comprises one or more of a group consisting of copper, nickel, gold, platinum, aluminum, and chrome.

4. Magnetic particle having a high-reflective protective membrane according to claim 1, wherein the high-reflective protective membrane having a single-layer structure is made out of one or more of a group consisting of titanium dioxide, silicon dioxide, alumina, calcium carbonate, zirconium oxide, magnesium fluoride, zinc oxide, zinc, sulfide, aluminum oxide, chromium oxide, cadmium oxide, vanadium pentoxide, polyisobutylene, polyethylene, acrylic polymer, and styrene polymer.

5. Magnetic particle having a high-reflective protective membrane according to claim 1, wherein the high-reflective protective membrane having a multiple-layers structure is configured in such a manner that the low-refractive-index membrane and the high-refractive-index membrane formed on the low-refractive-index membrane are repeatedly laminated to each other.

6. Method for producing a magnetic particle having a high-reflective protective membrane, comprising:
forming a first shell containing a dielectric material on an outer surface of a magnetic core;
forming a second shell containing a metallic material on an outer surface of the first shell; and
forming a high-reflective protective membrane with a single-layer having an optical thickness of $(0.42*N)-0.17$ to $(0.42*N)+0.17$ wavelength, where N is an integer, on an outer surface of the second shell, or forming multiple-layers having a low-refractive-index membrane having an optical thickness in the range of 0.15 to 0.35 wavelength formed on an outer surface of the second shell and a high-refractive-index membrane having an optical thickness in the range of 0.15 to 0.35 wavelength formed on an outer surface of the low-refractive-index membrane;
wherein the first shell has a single-layer structure, and the dielectric material of the first shell comprises titanium dioxide,
wherein the second shell has a single-layer structure, and the metallic material of the second shell comprises silver,
wherein the low-refractive-index membrane is made out of silicon dioxide and optionally one or more of a group consisting of magnesium fluoride, polystyrene, polymethyl methacrylate, polystyrene-co-butadiene, vanadium pentoxide, cadmium oxide, polyisobutylene, and polyethylene, and
wherein the high-refractive-index membrane is made out of titanium dioxide and optionally one or more of a group consisting of aluminum oxide, zinc oxide, zirconium oxide, and chromium oxide.

7. Method for producing a magnetic particle having a high-reflective protective membrane according to claim 6, wherein the dielectric material used to form the first shell further comprises one or more of a group consisting of silicon dioxide, alumina, calcium carbonate, zirconium oxide, magnesium fluoride, zinc oxide, and zinc sulfide.

8. Method for producing a magnetic particle having a high-reflective protective membrane according to claim 6, wherein the metallic material used to form the second shell further comprises one or more of a group consisting of copper, nickel, gold, platinum, aluminum, and chrome.

9. Magnetic particle having a high-reflective protective membrane according to claim 1, wherein the magnetic particle is contained in anti-forgery ink that are used to prevent marketable securities from being forged.

* * * * *

UNITED STATES PATENT AND TRADEMARK OFFICE
CERTIFICATE OF CORRECTION

PATENT NO.        : 9,721,705 B2
APPLICATION NO.   : 14/366026
DATED             : August 1, 2017
INVENTOR(S)       : Won Gyun Choe et al.

It is certified that error appears in the above-identified patent and that said Letters Patent is hereby corrected as shown below:

Column 13, Line 59, Claim 4 delete "zinc, sulfide," and insert -- zinc sulfide, --

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*